United States Patent [19]

Williams

[11] 4,055,150

[45] Oct. 25, 1977

[54] ANIMAL OILER DEVICE

[76] Inventor: Richard R. Williams, P.O. Box 25, Ithaca, Nebr. 68033

[21] Appl. No.: 683,988

[22] Filed: July 16, 1976

[51] Int. Cl.² .......................................... A01K 29/00
[52] U.S. Cl. ................................................ 119/157
[58] Field of Search ..................................... 119/157

[56] References Cited

U.S. PATENT DOCUMENTS

| 1,235,265 | 7/1917 | Wenzelmann et al. | 119/157 |
| 1,528,402 | 3/1925 | Clements | 119/157 |

Primary Examiner—Hugh R. Chamblee
Attorney, Agent, or Firm—Henderson, Strom & Sturm

[57] ABSTRACT

An improved animal oiler device having an extensive frame base, an upstanding shaft secured to the base, a pair of spaced horizontally disposed plates rotatably mounted on the shaft, a plurality of generally upstanding wooden posts rotatably secured between the plates and an oil reservoir formed in each post, wherein oil disposed in said reservoir will seep to the periphery of the post. The action of the animal rubbing on the post will cause the post to rotate, thus presenting a large surface of oil to the skin of the animal, and further, the rotation of the post about the shaft prevents damage to the oiler.

7 Claims, 5 Drawing Figures

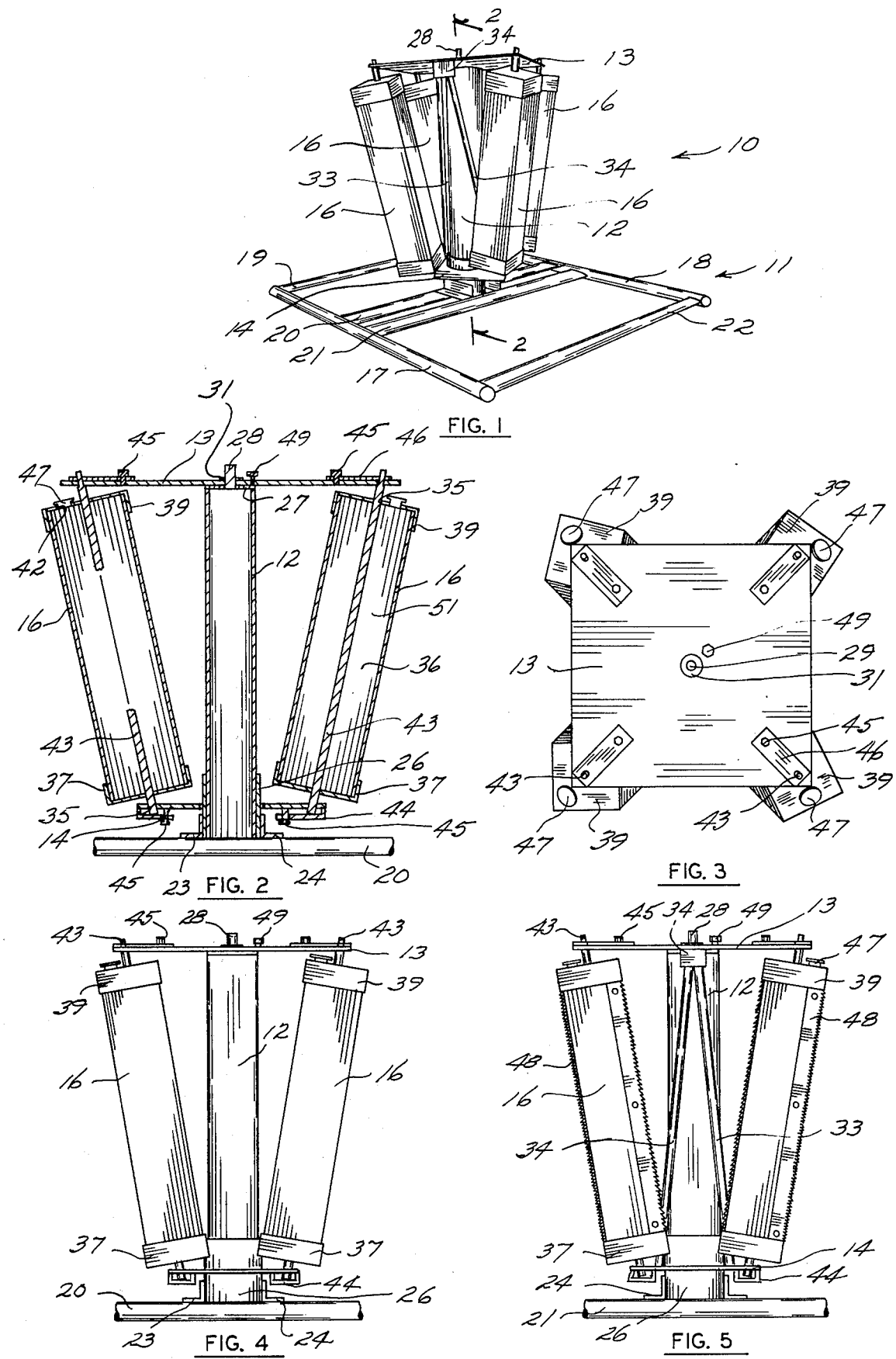

ANIMAL OILER DEVICE

BACKGROUND OF THE INVENTION

Animal oilers are utilized to oil the coat of animals for the purpose of repelling flies and other insects, thus making the animal more comfortable. It has been found that if an animal can be kept comfortable, the weight-gain per the amount of food intake can be increased.

This invention relates to an animal oiler wherein the oiling of the animal is controlled by the action of the animal rubbing against oil impregnated posts.

Many oilers involve a complex series of valve systems, are highly complex in construction, are unstable, are extremely heavy, are readily damaged by the animal in use, and are not necessarily effective in applying oil to the animal.

SUMMARY OF THE INVENTION

This invention relates to an improved animal oiler having a frame base member, an upright shaft secured to the base member, horizontally disposed spaced plates rotatably secured to said shaft, a plurality of spaced oiling posts rotatably mounted between said plates and a break unit operably connected between one of the plates and said shaft to control the rotation of said plates. The base projects substantially outwardly of the shaft and posts, thus considerable stability is provided. The oiling posts are formed of wood and have oil reservoirs drilled therein and the oil seeps through the post to its periphery.

The rubbing action of the animal against the post provides a process of self oiling. As the posts rotate between the plates and the plates rotate about the shaft, the pressure of the animal against a particular post will not tend to damage the structure or to tip it over but will merely cause the post to rotate.

It is, therefore, an object of this invention to provide an improved animal oiler.

Another object of this invention is the provision of an animal oiler which is simple in design, durable and stable of construction, safe for animals to use, and extremely effective in applying oil.

Other objects, advantages and nnovel features of this invention will become readily apparent from the following detailed description of the invention when considered in conjunction with the accompanying drawings.

BRIEF DESCRIPTION OF THE DRAWINGS

FIG. 1 is a perspective view of the animal oiler of this invention;

FIG. 2 is a cross-sectional view of the oiler taken along the lines 2—2 in FIG. 1;

FIG. 3 is a top plan view;

FIG. 4 is a side elevational view of a modified embodiment of the oiler of this invention; and FIG. 5 is a side elevational view of a second modified embodiment of the animal oiler of this invention.

DESCRIPTION OF THE PREFERRED EMBODIMENT

Referring to the drawings and particularly to FIG. 1, the animal oiler device of this invention is depicted generally at 10. The device comprises a frame base member 11, an upright shaft 12 secured to the base member 11, a pair of spaced generally horizontally disposed square plates 13 and 14 rotatably mounted on the upright shaft 12 and four square oiling posts 16 rotatably secured between the plates 13 and 14 and equally spaced around the shaft.

The frame base member 11 (FIG. 1) is formed of tubular members and includes a pair of parallel longitudinally disposed members 17 and 18 and four laterally disposed parallel members 19-22. The outer two lateral members 19 and 22 are secured at their ends to the ends of the longitudinal members 17 and 18 to form a rectangular frame base. Proximate the center of the longitudinal members and spaced only a short distance apart are the two center lateral members 20 and 21. At substantially the mid point of the two center lateral members 20 and 21 a pair of longitudinally disposed parallel single irons 23 and 24 (FIGS. 1 and 2) are secured at their ends to the members 20 and 21. Secured between the angle irons and projecting upwardly therefrom is a stock sleeve 26.

Mounted in the sleeve 26 (FIGS. 2 and 3) and projecting upwardly therefrom is the upright, cylindrical shaft 12. Secured to the upper end of the shaft is a diametrally disposed cap 27. A stub shaft 28 projects axially from the cap 27. Rotatably mounted on the stub shaft 28 is the top plate 13.

The top plate 13 has a hole 29 formed centrally therethrough, through which the stub shaft 28 projects. It will best be observed in FIG. 2 that the top plate is disposed on the cap 27 and on the upper end of the shaft 12. A washer 31 having a diameter slightly smaller than or the same as the diameter of the stub shaft 28 is forced into the stub shaft to secure the top plate thereto. Disposed below the top plate is the bottom plate 14 which has an opening 32 formed centrally therethrough for receiving therein a stub sleeve 26. Two sets of the rods are secured between the top and bottom plates 13 and 14 (FIGS. 1 and 5). Each set consists of two rods 33 and 34 secured together at their top ends to a boss 34 secured to and depending from the under side of the top plate proximate one of its outer edges. The lower ends of the two rods diverge and are secured to the bottom plate 14 proximate the sleeve opening with the lower end of one rod of each set secured proximate each other. Thus it will be noted that the two plates are secured together by the two sets of tie rods with the larger of the two plates mounted above the smaller of the two. Proximate the corners of each plate (top and bottom) is an inclined hole 35 wherein a top plate hole is axially aligned with a bottom plate hole.

The oiling posts 16 (FIGS. 2 and 3) formed from wood and square in cross sectional view are identical, therefore, only one will be described with like parts of the other posts being identified by like numerals. Each post 16 has a hole 36 formed axially therethrough (FIG. 2) or at least partially therethrough from its upper end. A square bottom cap 37 having a hole 38 formed centrally therethrough is secured over the bottom end of the post and a square top cap 39, having a hole 41 formed centrally therethrough and an opening 42 formed therethrough and spaced from the hole 41, is secured over the top end of the post. Axially disposed through the post 16 and extending through the holes 38 and 41 is a post axle 43. The ends of the post axle are rotatably disposed between the plates 13 and 14 in the aligned holes 35. Secured to the bottom surface of the bottom plate over each hole by a screw 45 is a strap 44 for holding the post shaft in position. Secured to the uppr surface of the top plate over each hole by a screw 45 is a top strap 46 for journally receiving the upper end of the post shaft 43. Removably mounted in the top cap opening 42 is a plug 47.

Adjacent the washer 31 and stub shaft 28 is a tapped hole 48 and threadably disposed in the hole 48 is a bolt 49. The shank end of the bolt is disposed proximate the cap 27 wherein if the bolt is turned into the hole the shank end contacts the cap and acts as a brake to retrard the rotation of the plates about the shaft.

In operation, the plugs 47 are removed and the hollow interiors of each post, reservoir 51, are filled with oil. The oil seeps through the walls of the post and not only permeates the wood, but also coats the outer surface thereof. If the post is formed of a material wherein the oil will not seep therefrom, then small pores may be drilled through the post to a reservoir to permit seepage. An animal rubbing against a post causes the post to rotate between the plates thus presenting each side of the post to the hide of the animal. If too much pressure is placed against the post, the plates will rotate about the shaft thus relieving any extensive pressure against the shaft. It will, therefore, be noted that not only will each post be protected as it rotates about the shaft, the overall structure will be protected from tipping and damage.

With the bottom plate being smaller than the top plate, or if the top plate holes are set outwardly of the holes in the lower plate, the posts will be angularly inclined. It has been found that an animal can coat a greater part of its hide by such a positioning, however, if the posts are vertical or inwardly inclined, a portion of the hide can still be coated.

FIG. 4 depicts a first modified embodiment of the invention wherein the two sets of tie rods are not utilized, and the height of the device is increased to accommodate a larger animal.

FIG. 5 shows a second modified embodiment of the invention wherein each side of the post has a saw-toothed elongated rod 48 secured thereto with the saw-toothed edge projecting outwardly to present a scratching surface for the animal to rub against.

Although a preferred embodiment and two modified embodiments are depicted and described hereinabove, it is to be remembered that various modifications may be made thereto without departing from the invention as defined in the appended claims.

I claim:

1. An animal oiler device comprising:
    a base member;
    an upright shaft secured to said base member;
    a pair of spaced generally horizontally disposed plates rotatably mounted on said shaft;
    a plurality of spaced generally upright post means rotatably mounted between said plates, each post means having a reservoir formed therein form containing oil and each post means having means formed therein to permit the oil to seep from the reservoir to the surface thereof.

2. An animal oiler device as defined in claim 1 including tie rods secured between said plates.

3. An animal oiler device as defined in claim 1 including a brake unit operably connected between one of said plates about said shaft.

4. An animal oiler device as defined in claim 3 including at least one scratching rod secured to each post means and extending outwardly therefrom.

5. An animal oiler device as defined in claim 3 and said spaced plates include a top plate having four holes formed therein an equal distance from the center of said top plate and a bottom plate having four holes formed therein an equal distance from the center of said bottom plate; each post means includes an elongated square wooden post having a hole formed therein from the top end thereof for forming an oil reservoir, a pair of caps, one mounted on each end of said post, a post axle axially disposed through said post and extending from each end thereof with each end of said axle disposed in one of said plate holes; and each said top cap having an opening formed therethrough in communication with said post reservoir.

6. An animal oiler as defined in claim 5 and said base member includes a plurality of interconnected members which extend outwardly of said plates to provide stability.

7. An animal oiler as defined in claim 6 and including tie rods interconnecting said plates.

* * * * *